United States Patent [19]

Bartholomew

[11] Patent Number: 5,009,454
[45] Date of Patent: Apr. 23, 1991

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 296,232

[22] Filed: Jan. 12, 1989

Related U.S. Application Data

[60] Division of Ser. No. 99,654, Sep. 21, 1987, abandoned, which is a continuation of Ser. No. 776,642, Sep. 16, 1985, abandoned, and a continuation-in-part of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.$^5$ .............................................. F16L 35/00
[52] U.S. Cl. ...................................... 285/24; 285/93; 285/319
[58] Field of Search .................. 285/319, 340, 93, 320

[56] References Cited

U.S. PATENT DOCUMENTS

| | | |
|---|---|---|
| 1,542,421 | 4/1922 | Strongson . |
| 2,123,889 | 4/1937 | Gleason . |
| 2,550,591 | 10/1948 | Parsons . |
| 2,635,901 | 12/1953 | Osborn . |
| 2,935,338 | 5/1960 | Mills, Jr. . |
| 2,950,132 | 8/1960 | Kocsuta . |
| 3,139,293 | 6/1964 | Franck . |
| 3,314,696 | 4/1967 | Ferguson et al. . |
| 3,405,957 | 10/1968 | Chakroff . |
| 3,450,424 | 6/1969 | Calisher . |
| 3,453,005 | 7/1969 | Foults . |
| 3,534,988 | 10/1970 | Lindsey . |
| 3,538,940 | 11/1970 | Graham . |
| 3,569,903 | 3/1971 | Brishka . |
| 3,574,359 | 4/1971 | Klein . |
| 3,584,902 | 6/1971 | Vyne . |
| 3,650,549 | 3/1972 | Pepper . |
| 3,698,742 | 10/1972 | Jones et al. . |
| 3,711,125 | 1/1973 | Dehar . |
| 3,718,350 | 2/1973 | Klein . |
| 3,724,882 | 4/1973 | Dehar . |
| 3,826,523 | 7/1974 | Eschbaugh . |
| 3,929,356 | 12/1975 | DeVincent et al. . |
| 3,929,357 | 12/1975 | DeVincent et al. . |
| 3,980,324 | 9/1976 | Bouteille et al. . |
| 4,005,883 | 2/1977 | Guest . |
| 4,009,896 | 3/1977 | Brewer . |
| 4,021,062 | 5/1977 | Mariaulle . |

(List continued on next page.)

FOREIGN PATENT DOCUMENTS

2307154 12/1973 Fed. Rep. of Germany .
134769 11/1919 United Kingdom ................ 285/340

OTHER PUBLICATIONS

IBM Technical Disclosure Bulletin, vol. 17, No. 7, Dec. 1974.

Primary Examiner—Dave W. Arola
Attorney, Agent, or Firm—Harness, Dickey & Pierce

[57] ABSTRACT

A swivelable quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore. Also, a safety sleeve is disclosed comprising a body, a tab on the body for indicating whether or not the conduit has been detached from the housing, and a window in the body for indicating whether or not the conduit is properly secured in the housing. Further, a retainer element is disclosed comprising a collar, an orientation means on the collar and at least one or more deflectable bent configuration legs projecting from the collar for retaining the conduit in the retainer element and in the housing.

7 Claims, 1 Drawing Sheet

U.S. PATENT DOCUMENTS

| | | |
|---|---|---|
| 4,059,288 | 11/1977 | Mohr . |
| 4,073,514 | 2/1978 | Pate . |
| 4,080,752 | 3/1978 | Burge . |
| 4,111,464 | 9/1978 | Asano et al. . |
| 4,123,089 | 10/1978 | Viero et al. . |
| 4,123,090 | 10/1978 | Kotsakis et al. . |
| 4,123,091 | 10/1978 | Cosentino et al. . |
| 4,128,264 | 12/1978 | Oldford . |
| 4,135,745 | 1/1979 | Dehar . |
| 4,214,586 | 7/1980 | Mericle . |
| 4,266,814 | 5/1981 | Gallagher . |
| 4,305,606 | 12/1981 | Legris . |
| 4,423,892 | 1/1984 | Bartholomew . |
| 4,500,117 | 2/1985 | Ayers et al. . |
| 4,524,995 | 6/1985 | Bartholomew . |
| 4,526,411 | 7/1985 | Bartholomew . |
| 4,601,497 | 7/1986 | Bartholomew . |
| 4,681,351 | 7/1987 | Bartholomew . |

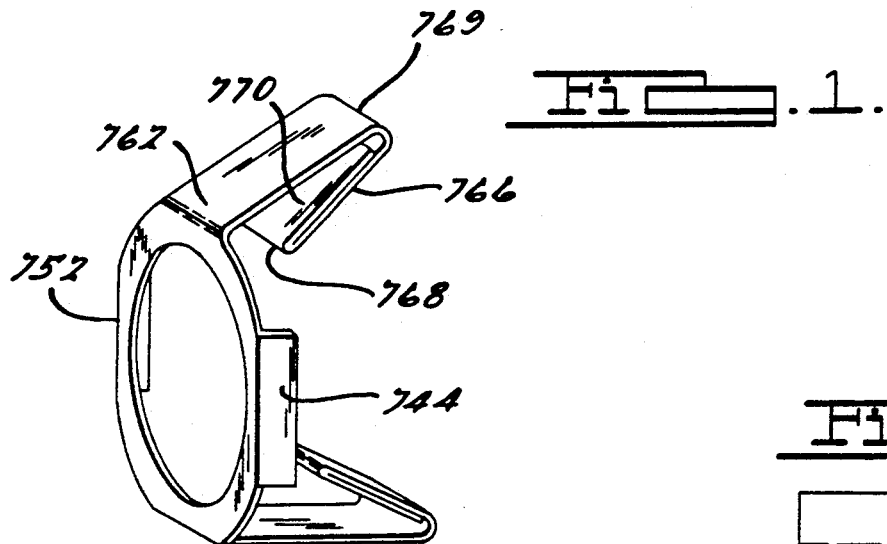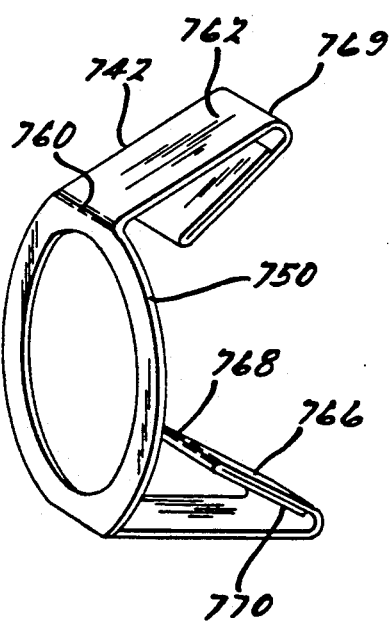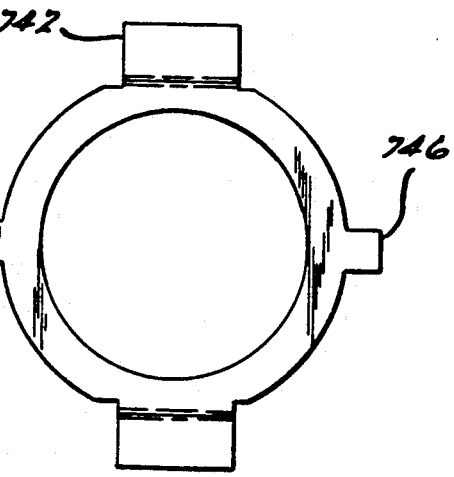

SWIVELABLE QUICK CONNECTOR ASSEMBLY

CROSS REFERENCE TO A RELATED APPLICATION

This is a division of U.S. patent application Ser. No. 099,654, filed Sept. 21, 1987 which is a Continuation Application of U.S. application Ser. No. 776,642 filed Sept. 16, 1985, now abandoned, both entitled A SWIVELABLE QUICK CONNECTOR ASSEMBLY, and a continuation-in-part of application Ser. No. 360,201, filed Mar. 22, 1982, now U.S. Pat. No. 4,601,497, which is a continuation-in-part of application Ser. No. 201,711 filed Oct. 29, 1980, now U.S. Pat. No. 4,423,892, which are hereby incorporated by reference.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assembly components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Additional objects and advantages of the present invention will become apparent from reading of the detailed description of the preferred embodiments which make reference to the following set of drawings in which:

BRIEF DESCRIPTION OF THE DRAWINGS

FIG. 1 is a perspective view of another embodiment of a retainer element.

FIG. 2 is a perspective view of another embodiment of a retainer element.

FIG. 3 is an elevation view of another embodiment of a retainer element.

FIG. 4 is an elevation view of another embodiment of a retainer element.

DETAILED DESCRIPTION OF THE PREFERRED EMBODIMENTS

Referring to FIGS. 1, 2, 3 and 4, a perspective, a second perspective, a front elevation, and a second front elevation view of the retainer element 724 is shown. The retainer element 724 is manufactured from a molded plastic or metallic material, depending upon the particular application thereof. Also, the retainer has non-removable characteristics; however, if desired, a tool may be inserted into the housing 720 which will remove the retainer element 724 from the housing 720. The retainer element 724, preferably a one-piece construction, includes a collar 740 and at least one or more deflectable bent configuration legs 742.

The collar 740 may have flanges 744, tabs 746, flats 748 or rounds 750 between the legs 742. All of the elements mentioned, which will be described herein, provide a means for rotationally orientating the retainer element 724 relative to the housing 720 preparatory to assembly of the element 724 therewith. The collar 740 has an aperture 741 for providing passage of the conduit 722 through the retainer element 724. More specifically, the flanges 744, tabs 746, etc. are intended to facilitate rotational orientation of the retainer element 724 with respect to the associated housing, so that the locking or retaining legs 742 (hereinafter described) are positively rotationally oriented with respect to the correlative windows or apertures 534 in the associated housing, as seen in FIG. 34 and 35, whereby to obviate the possibility of the legs 742 not lockingly engaging the rearward edges of the windows or apertures 534, which nonengagement (and the consequential non-securing of the conduit 722 within the housing 720) might occur in the event the legs 742 were not properly rotationally aligned therewith.

The flanges 744, best seen in FIG. 1, project from the collar 740, forming straight edges 752 along the collar 740. The housing 720, when this type of retainer element is used, has a pair of flat surface walls for complementing the flat edges 752 of the retainer element 724. The flat housing walls enable the retainer element 724 to be positioned in a proper orientation in the housing 720. Thus, the flat edge-flat wall configuration eliminates the chance of improper positioning of the retainer element 724 in the housing 720.

The tabs 746, preferably having an overall rectangular configuration, as best seen in FIG. 4, project from the collar 740. The housing 720, when this type of retainer element is used, has a pair of substantially rectangular grooves in the surface walls of the housing for complementing the tabs 746. The grooves enable the retainer element 724 to be positioned in a proper orientation in the housing 720. Thus, this tab-groove configuration eliminates the chance of improper positioning of the retainer element 724 in the housing 720.

The collar 740 may have flats 748, as best seen in FIG. 3. The housing 720, when this type of retainer element is used, has a pai of flat surface walls for complementing the flats 748 of the retainer element 724. The flat housing walls enable the retainer element 724 to be positioned in a proper orientation in the housing 720. Thus, this flats-flat wall configuration eliminates the chance of improper positioning of the retainer element 724 in the housing 720.

The collar 740 may have rounds 750, best seen in FIG. 2. When this is the case, the projecting legs 742 form flat edges 760. Thus, the housing 720, when this type of retainer is used, has a pair of flat surface walls for complementing the flat edges 760 of the retainer element 724. The flat housing walls enable the retainer element 724 to be positioned in a proper orientation in the housing 720. Thus, this flat edge-flat wall configuration eliminates the chance of improper positioning of the retainer element 724 in the housing 720.

The legs 742 have a first portion 762, a first retaining bend 764, a first retaining portion 766, a second retaining bend 768 and a second retaining portion 770. The first portion 762 of the legs 742 project from the collar 740. The first portion 762 bends forming the first retaining bend 768. The first retaining bend 764 secures the retainer element 724 on a housing flange 772 in the housing 720. The first retaining bend 764 bends forming the first retaining portion 766. The second retaining bend 768 is formed at the bend of the first and second retaining portions 766 and 770. The second retaining bend 768 abuts against the conduit flange 726 securing the conduit 722 in the retainer element 724. The second retaining portion 770 doubles back on the first retaining portion 766 for enhancing retaining force characteristics of the retaining element 724. The legs 742 are bent in accordance with conventional sheet metal practices.

While the above description constitutes the preferred embodiments of the present invention, it will be appreciated that the invention is susceptible to modification, variation and change without departing from the proper scope and fair meaning of the accompanying claims.

What is claimed is:

1. A retainer element for securing a conduit in a connector having at least one window for enabling visual inspection of the conduit through the window, the retainer element comprising:
   a collar means, said collar means having an aperture therethrough for passage of the conduit;
   at least one deflectable leg means projecting from said collar means, said leg means being bent to form at least one integral means for securing the conduit in said retainer element and in the connector;
   said leg means having a first portion projecting from said collar means, a first bend and first retaining portion for securing said retainer element in the connector, and a second bend and second retaining portion for securing the conduit in said retainer element; and
   means on said collar means for rotationally orientating said leg means with respect to the window.

2. The retainer element according to claim 1 wherein said orientating means includes at least one flange forming a flat edge on said collar.

3. The retainer element according to claim 1 wherein said orientating means includes at least one tab on said collar.

4. The retainer element according to claim 1 wherein said orientating means includes at least one flat on said collar.

5. The retainer element according to claim 1 wherein said orientating means includes at least one round on said collar and said leg means form a flat edge on said collar.

6. A retainer element for securing a conduit in a connector having at least one window for enabling visual inspection of the conduit through the window, the retainer element comprising:
   a collar means, said collar means having an aperture therethrough for passage of the conduit;
   a plurality of deflectable leg means projecting from said collar means, said leg means being bent to form a plurality of integral means for securing the conduit in said retainer element and in the connector;
   wherein said leg means has a first portion projecting from said collar means, a first bend and first retaining portion for securing said retainer element in the connector, and a second bend and second retaining portion for securing the conduit in said retainer element;
   means on said collar means for rotationally orientating said leg means with respect to the window; and
   wherein said orientating means includes at least one tab on said collar means.

7. A retainer element for securing a conduit in a connector having at least one window for enabling visual inspection of the conduit through the window, the retainer element comprising:
   a collar means, said collar means having an aperture therethrough for passage of the conduit;
   a plurality of deflectable leg means projecting from said collar means, and leg means being bent to form a plurality of integral means for securing the conduit in said retainer element and in the connector;
   wherein said leg means has a first portion projecting from said collar means, a first bend and first retaining portion for securing said retainer element in the connector, and a second bend and second retaining portion for securing the conduit in said retainer element;
   means on said collar means for rotationally orientating said leg means with respect to the window; and
   wherein said orientating means includes at least one flat on said collar means.

* * * * *

UNITED STATES PATENT AND TRADEMARK OFFICE
CERTIFICATE OF CORRECTION

PATENT NO. : 5,009,454

DATED : Apr. 23, 1991

INVENTOR(S) : Donald D. Bartholomew

It is certified that error appears in the above-identified patent and that said Letters Patent is hereby corrected as shown below:

On the title page under "U.S. Patent Documents" ref. to 2,550,591, "10/1948" should be --4/1951--;

On the title page under "U.S. Patent Documents" ref. to 2,635,901, "12/1953" should be --4/1953--;

Col. 1, Line 23, "assembly" should be --assemble--;

Col. 2, Line 21, "FIG." should be --FIGS.--;

Col. 2, Line 51, "pai" should be --pair--;

Col. 4, Line 35, Claim 7, "and" should be --said--.

Signed and Sealed this

Eighth Day of December, 1992

Attest:

DOUGLAS B. COMER

*Attesting Officer*  *Acting Commissioner of Patents and Trademarks*